US011120156B2

(12) United States Patent
Handy Bosma et al.

(10) Patent No.: US 11,120,156 B2
(45) Date of Patent: Sep. 14, 2021

(54) PRIVACY PRESERVING DATA DELETION

(71) Applicant: International Business Machines Corporation, Armonk, NY (US)

(72) Inventors: John Handy Bosma, Leander, TX (US); Raymond Fallon, Poughkeepsie, NY (US); David Wayne Harrison, Patterson, NY (US); Leanna Holmquist, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 16/351,849

(22) Filed: Mar. 13, 2019

(65) Prior Publication Data

US 2020/0293679 A1     Sep. 17, 2020

(51) Int. Cl.
*H04L 29/06* (2006.01)
*G06F 21/62* (2013.01)
*H04L 9/06* (2006.01)

(52) U.S. Cl.
CPC ........ *G06F 21/6245* (2013.01); *H04L 9/0643* (2013.01); *H04L 63/10* (2013.01); *G06F 2221/2137* (2013.01); *G06F 2221/2143* (2013.01)

(58) Field of Classification Search
CPC ......... G06F 21/6245; G06F 2221/2137; G06F 2221/2143; H04L 9/0643; H04L 63/10

USPC .......................................................... 726/30
See application file for complete search history.

(56) References Cited

U.S. PATENT DOCUMENTS

| 6,336,134 B1* | 1/2002 | Varma ................. H04L 12/1813 |
| | | 709/201 |
| 9,141,658 B1* | 9/2015 | Nair ....................... G06F 16/353 |
| 2009/0281998 A1 | 11/2009 | Fein et al. |
| 2014/0041047 A1 | 2/2014 | Jaye et al. |

FOREIGN PATENT DOCUMENTS

WO    WO2015045973 A1    4/2015

* cited by examiner

*Primary Examiner* — Longbit Chai
(74) *Attorney, Agent, or Firm* — Yee & Associates, P.C.

(57) ABSTRACT

Preserving privacy of deleted personal data is provided. A registration of a client device is received. The client device stores a plurality of personal data corresponding to a plurality of data subjects. A copy of a set of personal data corresponding to a particular data subject deleted from the client device is received along with metadata describing the set of personal data deleted from the client device and a hash key based on the set of personal data deleted from the client device. Access to the copy of the set of personal data deleted from the client device is granted in response to receiving an access request that includes the hash key corresponding to the set of personal data from the particular data subject within a defined period of time. The copy of the set of personal data is deleted after expiration of the defined period of time.

20 Claims, 5 Drawing Sheets

PRIVACY PRESERVING DATA DELETION

BACKGROUND

1. Field

The disclosure relates generally to data storage and more specifically to privacy preserving deletion or erasure of personal data from structured data stores.

2. Description of the Related Art

Data storage is a general term for archiving data in electromagnetic or other forms for use by a computer or other data processing device. Data storage in a digital, machine-readable medium is sometimes called digital data. Personal digital data is personally identifiable information or sensitive personal information that can be used on its own or with other information to identify or locate a particular individual or to identify that individual in context. Data security means protecting digital data, such as personal information stored in a database, from unwanted access, use, disclosure, modification, or destruction by unauthorized users during a cyberattack or data breach, for example.

SUMMARY

According to one illustrative embodiment, a computer-implemented method for preserving privacy of deleted personal data is provided. A data deletion server receives a registration of a client device. The client device stores a plurality of personal data corresponding to a plurality of data subjects. The client device interacts with the data deletion server via an application programming interface. The data deletion server receives a copy of a set of personal data corresponding to a particular data subject deleted from the client device along with metadata describing the set of personal data deleted from the client device and a hash key based on the set of personal data deleted from the client device. The data deletion server grants access to the copy of the set of personal data deleted from the client device in response to receiving an access request that includes the hash key corresponding to the set of personal data from the particular data subject within a defined period of time. The data deletion server deletes the copy of the set of personal data from the data deletion server after expiration of the defined period of time. According to other illustrative embodiments, a computer system and computer program product for preserving privacy of deleted personal data are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
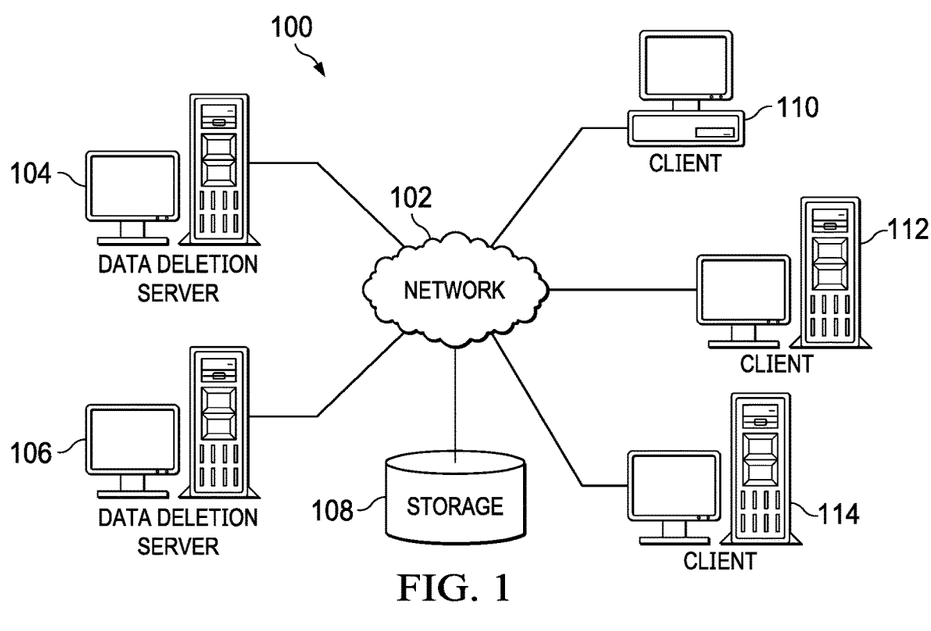
FIG. 1 is a pictorial representation of a network of data processing systems in which illustrative embodiments may be implemented.
Figure 2:
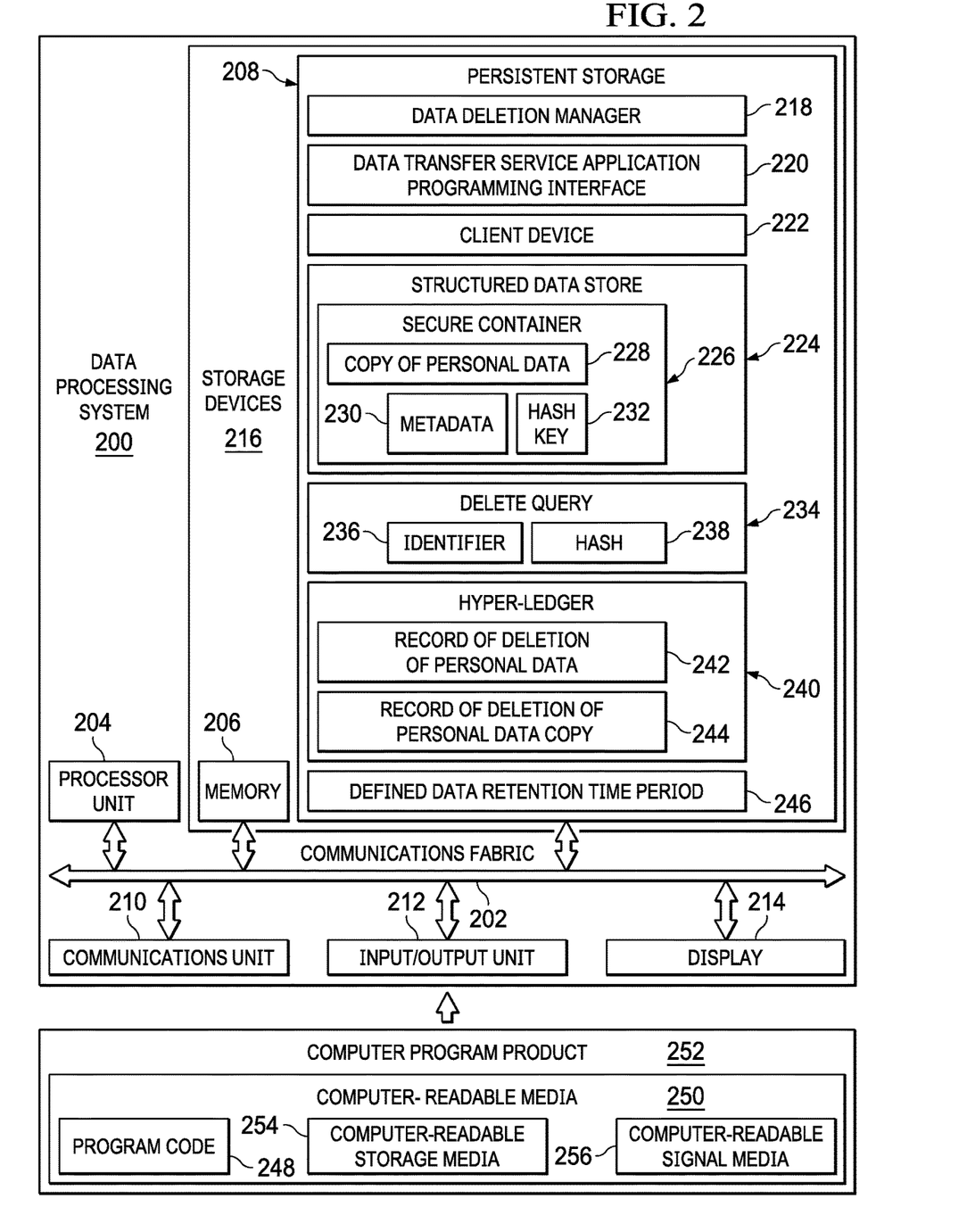
FIG. 2 is a diagram of a data processing system in which illustrative embodiments may be implemented.
Figure 3:
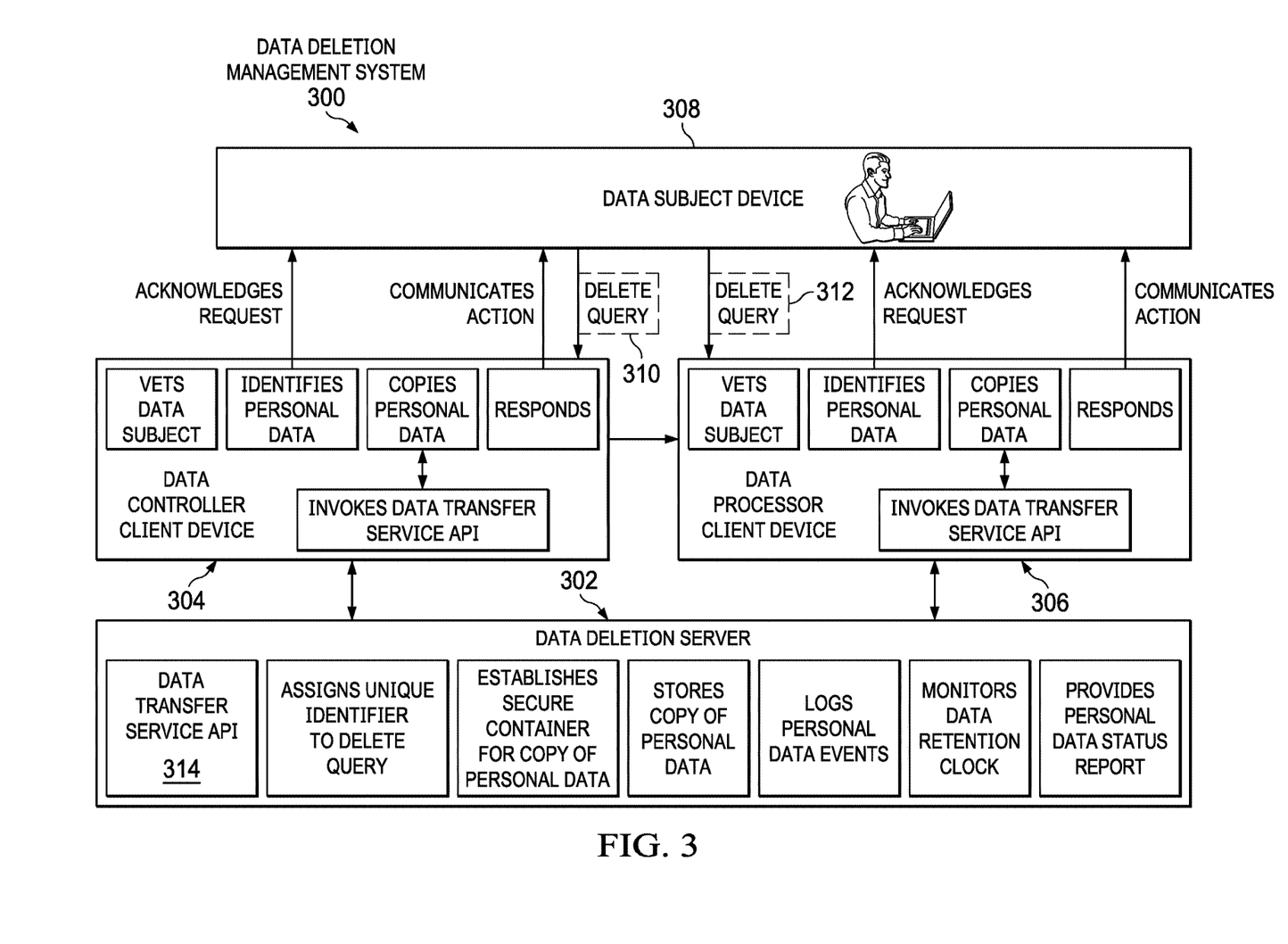
FIG. 3 is a diagram illustrating an example of a data deletion management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, data deletion server 104 and data deletion server 106 connect to network 102, along with storage 108. Data deletion server 104 and data deletion server 106 may be, for example, server computers with high-speed connections to network 102. In addition, data deletion server 104 and data deletion server 106 may provide a set of services, such as, for example, privacy preserving deletion of personal data services to registered client data processing systems. Also, it should be noted that data deletion server 104 and data deletion server 106 may represent clusters of servers in a data center. Alternatively, data deletion server 104 and data deletion server 106 may represent computing nodes in a cloud environment that manages an online data deletion service. Further, data deletion server 104 and data deletion server 106 may provide information, such as, for example, programs, application, updates, patches, application programming interfaces, and the like, to the registered client data processing systems.

Client 110, client 112, and client 114 also connect to network 102. Clients 110, 112, and 114 are clients of data deletion server 104 and data deletion server 106. In this example, client 110 is shown as desktop or personal computers with wire communication links to network 102. However, it should be noted that client 110 is an example only and may represent other types of data processing systems, such as, for example, a laptop computer, handheld computer, smart phone, smart watch, smart television, smart appliance, gaming device, or the like, with wire or wireless communication links to network 102. A user, such as, for example, a data subject, of client 110 may utilize client 110 to send a delete personal data request (i.e., a delete query) to client 112 and/or client 114 to have personal data corresponding to the data subject, which was collected and stored by client 112 and/or client 114, deleted from client 112 and/or client 114. A data subject is a person or individual that created the personal data corresponding to that particular data subject. In addition, it should be noted that client 110 may represent a plurality of different client devices corresponding to a plurality of different data subjects.

Also in this example, client 112 and client 114 each represent a data processing system that stores a plurality of different personal data sets corresponding to a plurality of different data subjects. Client 112 may represent, for example, a data processing system of a data controller. A data controller determines the purposes for which personal data is processed. For example, the data controller decides how and why the personal data should be processed. Client 114 may represent, for example, a data processing system of a data processor. A data processor only processes personal data on behalf of the data controller. In other words, the data processor only processes personal data provided by the data controller in accordance with data controller instructions. Further, it should be noted that client 112 and client 114 may each represent a plurality of data processing systems corresponding to different data controllers and data processors.

Upon receiving a delete personal data query from the data subject corresponding to client 110, client 112 and/or client 114 copy the personal data corresponding to the delete query and then delete the personal data from storage of client 112 and/or client 114. Deletion of the personal data is recorded in a hyper-ledger, such as, for example, a blockchain ledger. Furthermore, client 112 and/or client 114 transfer the copy of the personal data to data deletion server 104 or data deletion server 106 for management. Data deletion server 104 or data deletion server 106 store the copy of the personal data, which was deleted from client 112 and/or client 114, in a secure container of a structured data store on data deletion server 104 or data deletion server 106. The copy of the personal data is not accessible in the secure container without providing a hash key, which is based on the personal data, with the access request. Moreover, data deletion server 104 or data deletion server 106 monitors a data retention clock to determine when to delete the copy of the personal data from the structured data store. The data retention clock may be, for example, equal to 30 days. However, it should be noted that the data retention clock may be equal to any defined period of time, such as 1 day, 1 week, 1 month, 1 year, or the like. In response to expiration of the data retention clock, data deletion server 104 or data deletion server 106 deletes the copy of the personal data from the structured data store. Also, data deletion server 104 or data deletion server 106 records the deletion of the copy of the personal data from the structured data store in the hyper-ledger.

Storage 108 is a network storage device capable of storing any type of data in a structured format or an unstructured format. In addition, storage 108 may represent a plurality of network storage devices. Further, storage 108 may store identifiers and network addresses for a plurality of different data deletion servers, identifiers and network addresses for a plurality of different client devices, identifiers for a plurality of different users (i.e., data subjects), and the like. Furthermore, storage unit 108 may store other types of data, such as authentication or credential data that may include user names, passwords, and biometric data associated with users, system administrators, and data security analysts, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on data deletion server 104 and downloaded to client 112 over network 102 for use on client 112.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as data deletion server 104 in FIG. 1, in which computer readable program code or instructions implementing processes of illustrative embodiments may be located. Data processing system 200 corresponds to an online third-party data deletion service. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores data deletion manager 218. However, it should be noted that even though data deletion manager 218 is illustrated as residing in persistent storage 208, in an alternative illustrative embodiment data deletion manager 218 may be a separate component of data processing system 200. For example, data deletion manager 218 may be a hardware component coupled to communication fabric 202 or a combination of hardware and software components. In another alternative illustrative embodiment, a first set of components of data deletion manager 218 may be located in data processing system 200 and a second set of components of data deletion manager 218 may be located in a second data processing system, such as, for example, data deletion server 106 in FIG. 1.

Data deletion manager 218 controls the process of preserving privacy of personal data, which corresponds to a particular data subject, deleted from a structured data store of data processing system 200. Data deletion manager 218 utilizes data transfer service application programming interface 220 to enable transfer of data, such as copies of sets of personal data, which were deleted from registered client data processing systems, from the registered client data processing systems. Client device 222 represents an identifier of a registered client data processing system that is transferring a copy of a set of personal data corresponding to a particular data subject, which was deleted from client device 222, to data processing system 200 in response to client device 222 receiving a request to delete the set of personal data (i.e., a delete query) from the data subject.

Structured data store 224 may be, for example, a relational database that stores structured data. Structured data is built using information that is stored in fixed fields within a record or file. In this example, structured data store 224 includes secure container 226, which stores copy of personal data 228, metadata 230, and hash key 232.

Secure container 226 represents a secure, protected portion or section of structured data store 224. In other words, secure container 226 may only be accessed using the corresponding hash key, which in this example is hash key 232. Data deletion manager 218 generates secure container 226 to store copy of personal data 228 and protect copy of personal data 228 from unauthorized access. Copy of personal data 228 represents a copy of a set of personal data corresponding to the particular data subject (i.e., an identifiable person) deleted from client device 222, which may be a data controller or data processor, that collects and stores a plurality of different sets of personal data corresponding to a plurality of different data subjects. Data deletion manager 218 generates a secure container in structured data store 224 for each received copy of a set of personal data that was deleted from client device 222 or another client data processing system.

Metadata 230 provide a description of copy of personal data 228. Metadata 230 does not contain any personally identifiable information corresponding to the particular data subject. In addition, data deletion manager 218 retains metadata 230 after deletion of copy of personal data 228 from structured data store 224.

Hash key 232 is based on copy of personal data 228. A hash key is a smaller value that represents a larger piece of data (i.e., copy of personal data 228). Data deletion manager 218 utilizes a hash function, such as a one-way cryptographic hash function, to generate hash key 232. Data deletion manager 218 requires hash key 232 to be included in any request to access copy of personal data 228 in secure container 226. In addition, hash key 232 allows data deletion manager 218 to retrieve copy of personal data 228 from structured data store faster. Data deletion manager 218 provides hash key 232 to the particular data subject corresponding to copy of personal data 228. Also, it should be noted that a provider of the third-party online data deletion service only has access to metadata 230 and hash key 232.

Delete query 234 represents the request to delete the personal data corresponding to the particular data subject from client device 222 storing such information. Data deletion manager 218 generates identifier 236 for delete query 234. Identifier 236 represents a unique alphanumeric sequence that uniquely identifies delete query 234. In addition, data deletion manager 218 generates hash 238 of data query 234 for faster look up and retrieval. Data deletion manager 218 may utilize delete query 234 to confirm deletion of copy of personal data 228 from structured data store 224. For example, if running delete query 234 returns a null data set, then proof exists that copy of personal data 228 has been permanently deleted from structured data store 224.

Hyper-ledger 240 may be, for example, a blockchain ledger containing a series of immutable data blocks. Data deletion manager 218 utilizes hyper-ledger 240 to store record of deletion of personal data 242 and record of deletion of personal data copy 244. Record of deletion of personal data 242 is a recordation of the event deleting the personal data corresponding to the particular data subject from client device 222. Record of deletion of personal data copy 244 is a recordation of the event deleting copy of personal data 228 corresponding to the particular data subject from structured data store 224. Data deletion manager 218 utilizes hyper-ledger 240 as auditable proof or evidence of personal data deletion events. Data deletion manager 218 may provide hyper-ledger 240 to an authorized entity, such as a regulatory agency or other type of personal data deletion auditor.

Defined data retention time period 246 represents a predetermined amount of time that data deletion manager 218 will retain copy of personal data 228 in structured data store 224. In other words, at expiration of defined data retention time period 246, data deletion manager 218 will permanently delete or erase copy of personal data 228 from structured data store 224. Defined data retention time period 246 may be, for example, 30 days. However, defined data retention time period 246 may be any defined period of time.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer storage media 254 or computer readable signal media 256. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200. In some instances, computer readable storage media 254 may not be removable from data processing system 200.

Alternatively, program code 248 may be transferred to data processing system 200 using computer readable signal media 256. Computer readable signal media 256 may be, for example, a propagated data signal containing program code 248. For example, computer readable signal media 256 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 248 may be downloaded over a network to persistent storage 208 from another device or data processing system through computer readable signal media 256 for use within data processing system 200. For instance, program code stored in a computer readable storage media in a data processing system may be downloaded over a network from the data processing system to data processing system 200. The data processing system providing program code 248 may be a server computer, a client computer, or some other device capable of storing and transmitting program code 248.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 254 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments provide proof that personal data have been deleted pursuant to legal processes without saving an identifier corresponding to that personal data. Personal data are any information relating to an identifiable person (i.e., data subject) who can be directly or indirectly identified in particular by reference to an identifier, such as, for example, a name, identification number, location data, online identifier, or the like. Specifically, laws and regulations, such as the European Union's General Data Protection Regulation (GDPR), require organizations not only to delete or erase personal data, but also to provide auditable proof that the personal data have been erased. However, an issue exists as to how to provide this proof of deletion without saving information corresponding to the personal data, such as an identifier of the individual. A second issue is that even if records of deletion are available, storing these records of deletion in the data processing system where the deletions took place undercuts the ability to prove the data was deleted at a given point in time and the ability to prove that the deletions are permanent. Illustrative embodiments resolve these issues by preserving data privacy while providing proof of deletion across an arbitrary number of data stores.

Known approaches to address these issues have drawbacks. For example, one known approach is to keep a personal identifier corresponding to the person whose personal data has been deleted and add a certification of personal data deletion by entities responsible for data processing systems that store such data. However, keeping personal identifiers corresponding to persons whose data were deleted provides a means to identify those individuals. Data deletion certifications provide assurance of data deletion, but with no independent means to confirm the data deletion. Due to the openness of data processing systems that store such personal data, personal data can be repopulated, without a means to prevent this or confirm data deletion over time.

A second known approach is pseudonymization of personal data. Pseudonymization is a data management and de-identification procedure by which personally identifiable information fields within a data record are replaced by one or more artificial identifiers or pseudonyms. A pseudonym makes a data record less identifiable, while remaining suitable for data analysis and data processing. However, pseudonymized data can be restored to its original state with the addition of information which then allows individuals to be re-identified. In other words, pseudonymization does not delete personal data nor preserve a record of deletion such that the record of deletion is retrievable independently. Thus, pseudonymization does not meet the requirement of deleting personal data and recording proof of that deletion.

A second challenge is providing data controllers and data processors with a means to prove that personal data were deleted from their data processing systems, without storing the records of such deletions in those data processing systems, themselves. A data controller is an entity that determines the purposes, conditions, and means of processing personal data. A data processor is an entity that processes the personal data on behalf of the data controller. A data processor is typically an external third-party entity. As an example, an enterprise may have many employees. The enterprise signs a contract with a payroll company to pay employee wages. The enterprise tells the payroll company when the wages should be paid and provides employee details for the pay slips. The payroll company stores the employees' personal data. Thus, the enterprise is the data controller and the payroll company is the data processor in this example.

As a result, providing data controllers and data processors with a means to prove that personal data were deleted from their data processing systems, without storing the records of such deletions in those data processing systems, is needed because these data processing systems may change or become obsolete over time. Consequently, the obligation to preserve a record of data deletion may outlive the data processing system that stored the personal data. It should be noted that solving the second challenge of providing data controllers and data processors with a means to prove that personal data were deleted from their data processing systems, without storing the records of such deletions in those data processing systems, requires a clear solution to the first challenge of proving deletion of personal data without storing a personal identifier corresponding to the personal data deletion.

Illustrative embodiments provide an online data deletion service, offered through data transfer service application programming interfaces (APIs), that provides auditable proof of personal data deletion or erasure from structured data stores without saving personal identifiers corresponding to the deleted personal data. The online data deletion service provides APIs to register data controllers and data processors, implements inbound and outbound APIs to manage data deletion, and stores personal data deletion records in logical or physically separated data storage units, which are separate from other data processing systems of data controllers and data processors.

Illustrative embodiments accept as input an index of schemas, fields, or other data structures in a set of one or more data processing systems of data controllers or data processors that contain personal data; a timestamped, versioned delete query that deletes all personal data or a subset of the personal data requiring proof of deletion; proof of delete query execution, such as null results for the timestamped, versioned delete query, post-personal data deletion or erasure; a unique identifier for the delete query operation corresponding to the personal data deletion; a hash of the delete query, using, for example, a one-way cryptographic hash function, that allows retrieval of the delete query and re-run of the delete query on the set of data processing systems to check for null results post-personal data deletion or erasure; a defined time period, such as, for example, 30 days, for preventing access to deleted personal data after that defined time period; and an immutable set of personal data deletion records stored in a hyper-ledger, such as, for example, a blockchain, that does not contain any personal data.

A blockchain is a continuously growing chain of data blocks, which are linked and secured using cryptography. Each block typically contains a cryptographic hash of the previous block in the blockchain, as well as a timestamp and data corresponding to an event, such as a personal data deletion event. The cryptographic hash of the previous block in the blockchain, links the two blocks. The linked blocks form the blockchain. Blocks are appended in chronological order. In other words, the last block in the chain is the most recent block. Further, blocks are immutable (i.e., cannot be changed or deleted).

As a result, illustrative embodiments provide several technical advantages over current known solutions. For example, illustrative embodiments enable data controllers and data processors to store records of personal data deletion independently of those data processing systems in which the personal data deletion occurred. Further, illustrative embodiments provide a timestamped personal data deletion record with proof of when and how illustrative embodiments executed the deletion of the personal data. Furthermore, illustrative embodiments provide an immutable record of personal data deletion via the hyper-ledger or blockchain. Moreover, illustrative embodiments enable data controllers, processors, auditors, and optionally data subjects (i.e., identifiable individuals corresponding to personal data) to establish the persistence of the personal data deletion over time.

In one illustrative embodiment, the online personal data deletion service, data controller, and/or data processor create a separate web site with a structured data store on a data deletion server. When the data controller and/or data processor processes a personal data deletion request from a data subject (i.e., person or entity) corresponding to the personal data, the data controller and/or the data processor copy whatever personal data the data subject requests to be deleted from the data processing systems of the data controller and/or the data processor and store the copy of the personal data on the separate structured data store with metadata describing the personal data the data controller and/or the data processor had collected and stored. Illustrative embodiments generate a hash key based on the personal data and provide the data subject with the hash key to access the personal data on the separate structured data store. The data controller and/or the data processor also maintain the hash key, but only have access to the metadata describing the personal data on the structured data store. The data subject may access the personal data on the structured data store for a defined data retention time period (e.g., 30 days) by including the hash key with the access request. After expiration of the defined data retention time period, illustrative embodiments delete the personal data from the structured data store and all access, via the hash key, only enables the data subject, data controller, and/or data processor to view the metadata describing the deleted personal data and not the actual personal data. Illustrative embodiments store separate records for personal data deletion from the original source data processing systems (i.e., data controller and data processor data processing systems) and the copy of the personal data stored in the structured data store. For example, illustrative embodiments delete the personal data from the source data processing systems and then delete the copy of the personal data from the structured data store. Illustrative embodiments store records showing both deletions in the hyper-ledger or blockchain.

In an alternative illustrative embodiment, the data controller and/or the data processor create a web site with a structured data store on a data deletion server. When the data controller and/or data processor processes a personal data deletion request from a data subject corresponding to the personal data, the data controller and/or the data processor copy whatever personal data the data subject requests to be deleted from the data processing systems of the data controller and/or the data processor to the structured data store on the data deletion server. The web site provides a facility whereby the data subject may enable the personal data to be transported via, for example, email, download, specific industry format, and the like, to the structured data store on the data deletion server. In addition, the web site allows the data subject to select what personal data to transport to the structured data store using the metadata that describes the personal data the data controller and/or the data processor had collected and stored. The data controller and/or the data processor then implement the request to delete the personal data from their data processing systems.

In yet another alternative illustrative embodiment, the data controller and/or the data processor create a web site with a structured data store on a data deletion server. When the data controller and/or the data processor processes a personal data deletion request from a data subject corresponding to the personal data, the data controller and/or the data processor copy whatever personal data the data subject requests to be deleted from the data processing systems of the data controller and/or the data processor and store the copy of the personal data on the structured data store with metadata describing the personal data the data controller and/or the data processor had collected and stored. At some point before the defined period of time (e.g., 30 days) expires, the data subject may request an extension of time. The extension of time may be, for example, a second 30 days for review of the personal data by the data subject. The data subject may then decide that some portion of the personal data should be retained and another portion should be deleted. The web site enables the data subject to select what personal data to save or what personal data to delete using the metadata that describes the personal data the data controller and data processor had collected and stored. The data controller and/or the data processor then implement the request to delete the personal data from their data processing systems.

Thus, illustrative embodiments provide an online data deletion service to store personal data deletion records independent of the data processing systems of the data controller and data processor from which the personal data are deleted; provide proof of personal data deletion; store the delete query, but not the personal data; store the personal data deletion records in the hyper-ledger or blockchain; provide access to the personal data only to the corresponding data subject for a defined time period; and provide auditable proof of the persistence of the personal data deletion on a time interval basis to an authorized entity, such as, for example, a data deletion auditor or other regulatory agency.

In one alternative illustrative embodiment, the online data deletion service implements random sampling to confirm personal data deletion. This alternative illustrative embodiment implements an algorithm that randomly selects a predetermined number of sample delete queries to demonstrate that personal data corresponding to a respective delete query remains deleted. For example, if a selected sample delete query returns a null set result, then that is proof of deletion of the corresponding personal data. Consequently, the random sampling provides proof that personal data deletion is transpiring generally. In other words, the odds that personal data deletion was not happening would be very small if the delete query sampling was truly random. As a result, this random sampling provides a means for the provider of the online data deletion service to demonstrate personal data deletion across multiple data controllers or a single data controller on an ongoing basis.

Thus, illustrative embodiments provide one or more technical solutions that overcome a technical problem with preserving privacy of personal data deleted from storage. As a result, these one or more technical solutions provide a technical effect and practical application in the field of data storage.

With reference now to FIG. 3, a diagram illustrating an example of a data deletion management system is depicted in accordance with an illustrative embodiment. Data deletion management system 300 may be implemented in a network of data processing systems, such as network data processing system 100 in FIG. 1. Data deletion management system 300 is a system of hardware and software components for preserving privacy of deleted personal data corresponding to a data subject or individual.

In this example, data deletion management system 300 includes data deletion server 302, data controller client device 304, data processor client device 306, and data subject device 308. However, it should be noted that data deletion management system 300 is only meant as an example and not as a limitation on illustrative embodiments. In other words, data deletion management system 300 may include any number of data deletion servers, data controller client devices, data processor client devices, data subject devices, and other devices not shown.

Data deletion server 302, data controller client device 304, data processor client device 306, and data subject device 308 may be, for example, data deletion server 104, client 112, client 114, and client 110 in FIG. 1, respectively. Data controller client device 304, data processor client device 306, and data subject device 308 are registered data processing system clients of data deletion server 302. Data subject device 308 corresponds to a particular data subject. Data controller client device 304 is a data processing system corresponding to a data controller entity that collects and stores personal data for a plurality of data subjects including the particular data subject corresponding to data subject device 308. Data processor client device 306 is a data processing system corresponding to a data processor entity that processes personal data provided by and for data controller client device 304. In other words, data processor client device 306 stores all or a portion of the personal data stored on data controller client device 304 including the personal data corresponding to the particular data subject of data subject device 308.

At 310, data subject device 308 sends a delete query to data controller client device 304 requesting deletion of the personal data corresponding to the particular data subject associated with data subject device 308 that are stored on data controller client device 304. Upon receiving the delete query, data controller client device 304 vets or authenticates the particular data subject, identifies the set of personal data corresponding to the particular data subject stored on data controller client device 304, acknowledges receipt of the personal data deletion request, makes a copy of the set of personal data, invokes data transfer service application programming interface 314 on data deletion server 302 for transferring the copy of the set of personal data to data deletion server 302, and sends a response communicating the action of transferring the copy of the set of personal data to data deletion server 302 and deleting the set of personal data from data controller client device 304.

Similarly, at 312, data subject device 308 sends a delete query to data processor client device 306 requesting deletion of the personal data corresponding to the particular data subject associated with data subject device 308 that are stored on data processor client device 306. Upon receiving the delete query, data processor client device 306 vets or authenticates the particular data subject, identifies the set of personal data corresponding to the particular data subject stored on data processor client device 306, acknowledges receipt of the personal data deletion request, makes a copy of the set of personal data, invokes data transfer service application programming interface 314 on data deletion server 302 for transferring the copy of the set of personal data to data deletion server 302, and sends a response communicating the action of transferring the copy of the set of personal data to data deletion server 302 and deleting the set of personal data from data controller client device 304.

Upon invocation of data transfer service application programming interface 314 and transfer of the copy of the set of personal data corresponding to the particular data subject associated with data subject device 308 to data deletion server 302, data deletion server 302 assigns a unique identifier to the delete query and stores the delete query for later retrieval and re-run, establishes a secure container in a structured data store of data deletion server 302 for securely storing the copy of the set of personal data, stores the copy of the set of personal data in the secure container, logs the personal data events in a hyper-ledger, monitors a data retention clock to determine when to delete the set of personal data from the secure container, and provides a personal data status report to an authorized entity on a specified time interval basis.

Figure 4:
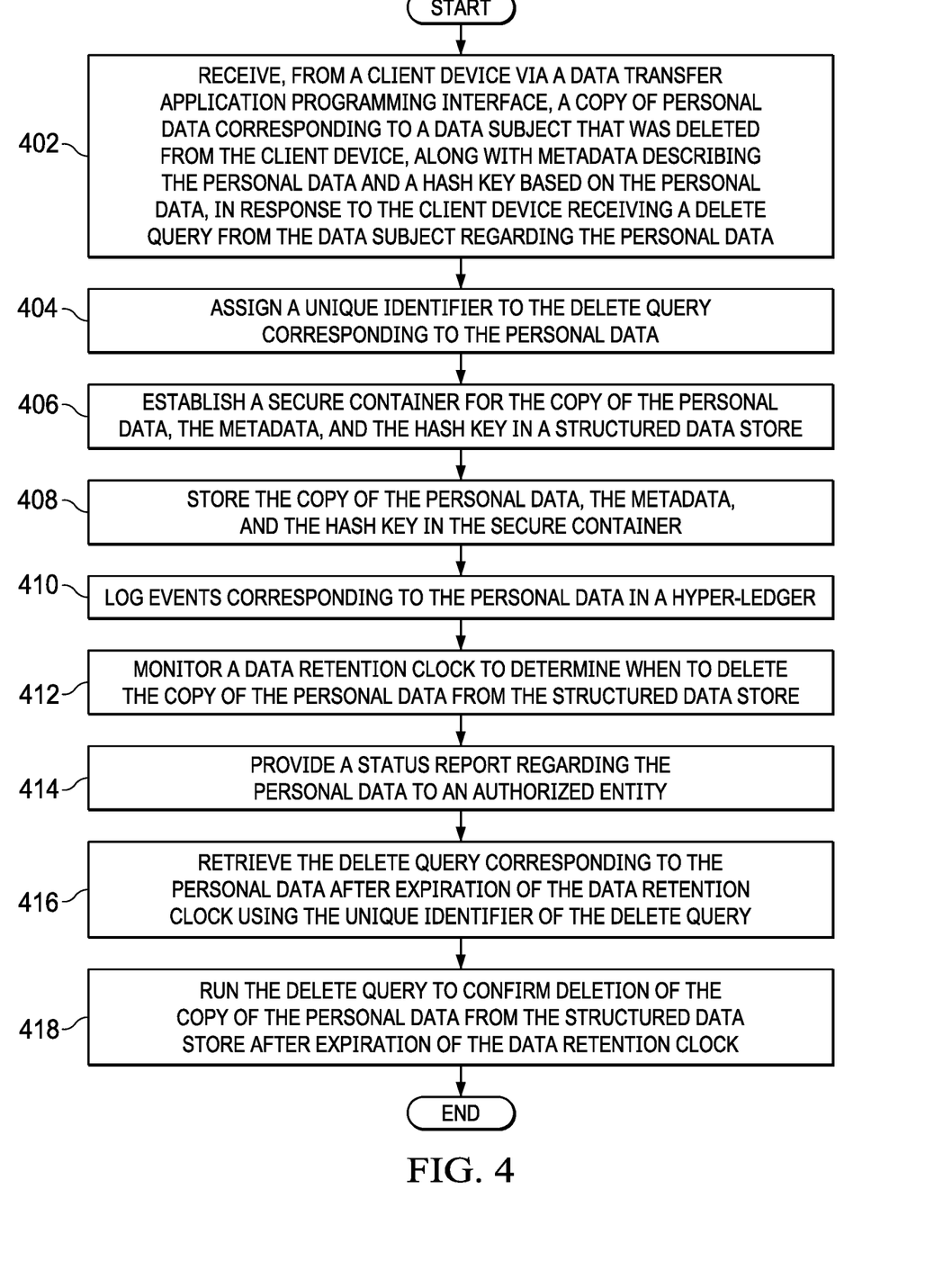
FIG. 4 is a flowchart illustrating a process for confirming deletion of personal data in accordance with an illustrative embodiment.

With reference now to FIG. 4, a flowchart illustrating a process for confirming deletion of personal data is shown in accordance with an illustrative embodiment. The process shown in FIG. 4 may be implemented in a data deletion server computer of a third-party online data deletion service, such as, for example, data deletion server 104 in FIG. 1, data processing system 200 in FIG. 2, or data deletion server 302 in FIG. 3.

The process begins when the data deletion server receives, from a client device via a data transfer application programming interface of the data deletion server, a copy of personal data corresponding to a data subject that was deleted from the client device in response to the client device receiving a delete query from the data subject regarding the personal data (step 402). It should be noted that the client device is a data processing system of a data controller or a data processor that stores a plurality of different personal data corresponding to a plurality of different data subjects. Further, in addition to the data deletion server receiving the copy of the personal data from the client device, the data deletion server also receives metadata describing the personal data and a hash key based on the personal data. Furthermore, it should be noted that the provider of the third-party online data deletion service only has access to the metadata and the hash key and not the copy of the personal data, itself.

After the data deletion server receives the copy of the personal data in step 402, the data deletion server assigns a unique identifier to the delete query corresponding to the personal data (step 404). In addition, the data deletion server stores the delete query for later retrieval and re-run. Further, the data deletion server establishes a secure container for the copy of the personal data, the metadata, and the hash key in a structured data store of the data deletion server (step 406).

The data deletion server stores the copy of the personal data, the metadata, and the hash key in the secure container of the structured data store (step 408). The data deletion server logs events corresponding to the personal data in a hyper-ledger (step 410). Furthermore, the data deletion server monitors a data retention clock to determine when to delete the copy of the personal data from the structured data store (step 412).

The data deletion server provides a status report regarding the personal data to an authorized entity on a specified time interval basis (step 414). Moreover, the data deletion server retrieves the delete query corresponding to the personal data after expiration of the data retention clock using the unique identifier of the delete query (step 416). Then, the data deletion server runs the delete query to confirm deletion of the copy of the personal data from the structured data store after expiration of the data retention clock based on the delete query returning a null data set proving the deletion (step 418). Thereafter, the process terminates.

Figure 5:
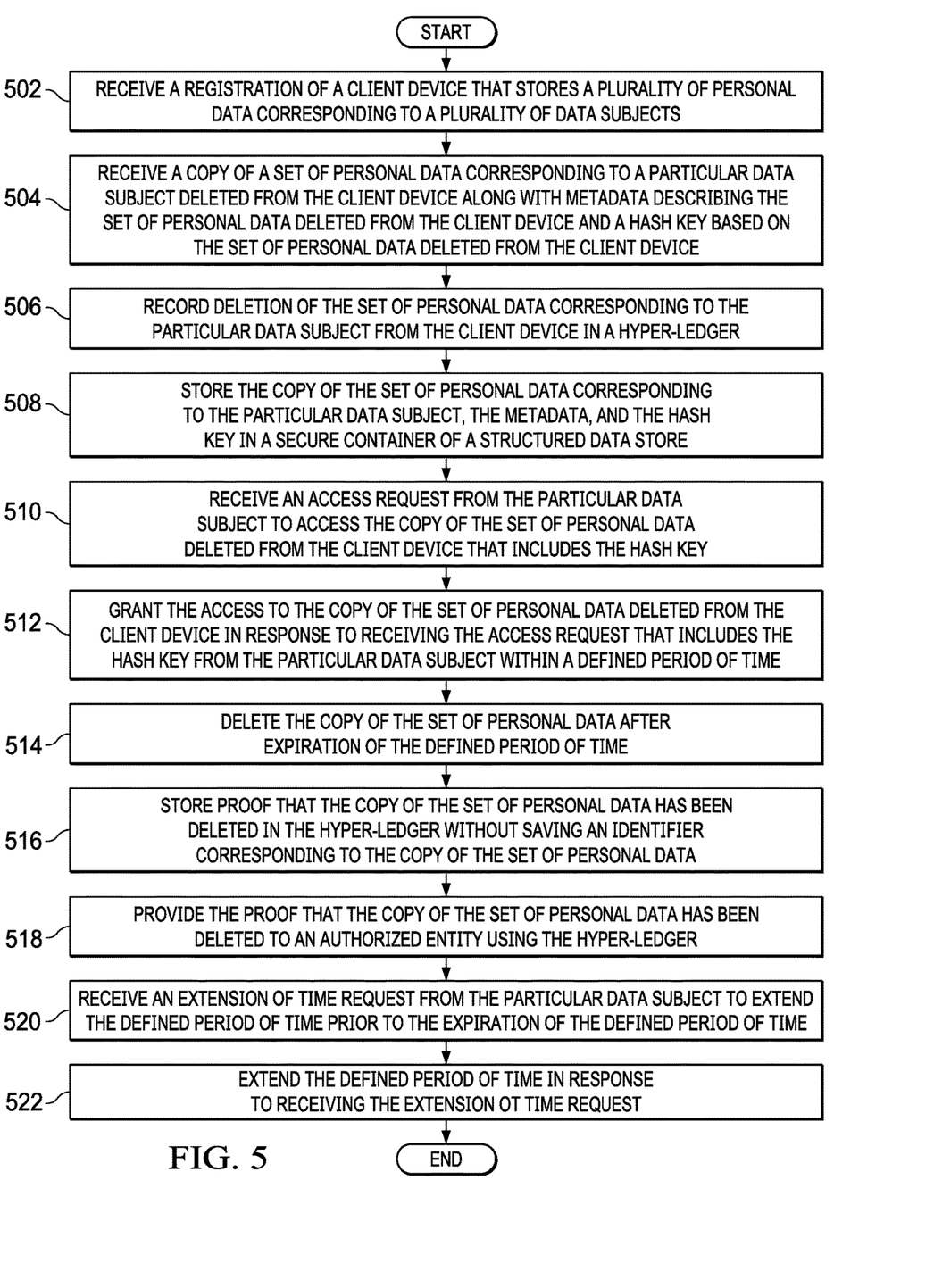
FIG. 5 is a flowchart illustrating a process for preserving privacy of deleted personal data in accordance with an illustrative embodiment.

With reference now to FIG. 5, a flowchart illustrating a process for preserving privacy of deleted personal data is shown in accordance with an illustrative embodiment. The process shown in FIG. 5 may be implemented in a data deletion server computer of a third-party online data deletion service, such as, for example, data deletion server 104 in FIG. 1, data processing system 200 in FIG. 2, or data deletion server 302 in FIG. 3.

The process begins when the data deletion server receives a registration of a client device that stores a plurality of personal data corresponding to a plurality of data subjects (step 502). The client device interacts with the data deletion server via a data transfer service application programming interface. The client device may be, for example, data controller client device 304 or data processor client device 306 in FIG. 3.

Subsequently, the data deletion server receives a copy of a set of personal data corresponding to a particular data subject deleted from the client device along with metadata describing the set of personal data deleted from the client device and a hash key based on the set of personal data deleted from the client device (step 504). The data deletion server records deletion of the set of personal data corresponding to the particular data subject from the client device in a hyper-ledger (step 506). In addition, the data deletion server stores the copy of the set of personal data corresponding to the particular data subject, the metadata, and the hash key in a secure container of a structured data store of the data deletion server (step 508).

The data deletion server receives an access request from the particular data subject to access the copy of the set of personal data deleted from the client device and stored in the secure container (step 510). The access request includes the hash key corresponding to the set of personal data. The data deletion server grants the access to the copy of the set of personal data deleted from the client device in response to receiving the access request that includes the hash key corresponding to the set of personal data from the particular data subject within a defined period of time (step 512).

The data deletion server deletes the copy of the set of personal data from the data deletion server after expiration of the defined period of time (step 514). Further, the data deletion server stores proof that the copy of the set of personal data has been deleted from the data deletion server in the hyper-ledger without saving an identifier corresponding to the copy of the set of personal data after the expiration of the defined period of time (step 516). Furthermore, the data deletion server provides the proof that the copy of the set of personal data has been deleted to an authorized entity using the hyper-ledger (step 518).

The data deletion server receives an extension of time request from the particular data subject to extend the defined period of time by an equal amount of time prior to the expiration of the defined period of time (step 520). The data deletion server extends the defined period of time by the equal amount of time in response to receiving the extension of time request prior to the expiration of the defined period of time (step 522). Thereafter, the process terminates.

Thus, illustrative embodiments of the present invention provide a computer-implemented method, computer system, and computer program product for preserving privacy of personal data deleted or erased from storage. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for preserving privacy of deleted personal data, the method comprising:
   receiving, by a data deletion server, a registration request from a client device to the data deletion server, the client device storing a plurality of personal data corresponding to a plurality of data subjects, wherein the client device interacts with the data deletion server via an application programming interface;
   receiving, by the data deletion server, a copy of a set of personal data corresponding to a particular data subject, which was deleted and transferred from the registered client device to the data deletion server along with metadata describing the deleted set of personal data and a hash key based on the deleted set of personal data via the application programming interface;
   granting, by the data deletion server, access to the copy of the deleted set of personal data in response to receiving an access request that includes the hash key corresponding to the deleted set of personal data from the particular data subject within a defined period of time; and
   deleting, by the data deletion server, the copy of the deleted set of personal data from the data deletion server after expiration of the defined period of time.

2. The method of claim 1 further comprising:
   storing, by the data deletion server, proof that the copy of the deleted set of personal data has been deleted from the data deletion server in a hyper-ledger without saving an identifier corresponding to the copy of the deleted set of personal data after the expiration of the defined period of time.

3. The method of claim 2 further comprising:
   providing, by the data deletion server, the proof that the copy of the deleted set of personal data has been deleted to an authorized entity using the hyper-ledger.

4. The method of claim 1 further comprising:
   recording, by the data deletion server, deletion of the deleted set of personal data corresponding to the particular data subject from the registered client device in a hyper-ledger;
   storing, by the data deletion server, the copy of the deleted set of personal data corresponding to the particular data subject, the metadata, and the hash key in a secure container of a structured data store of the data deletion server; and
   receiving, by the data deletion server, an access request from the particular data subject to access the copy of the deleted set of personal data stored in the secure container, the access request including the hash key.

5. The method of claim 1 further comprising:
   receiving, by the data deletion server, an extension of time request from the particular data subject to extend the defined period of time prior to the expiration of the defined period of time; and
   extending, by the data deletion server, the defined period of time by an equal amount of time in response to receiving the extension of time request prior to the expiration of the defined period of time.

6. The method of claim 1 further comprising:
   receiving, by the data deletion server, from the registered client device via the application programming interface, the copy of the deleted set of personal data corresponding to the particular data subject in response to the registered client device receiving a delete query from the particular data subject regarding the deleted set of personal data;
   assigning, by the data deletion server, a unique identifier to the delete query corresponding to the deleted set of personal data; and
   storing, by the data deletion server, the delete query for later retrieval and re-run.

7. The method of claim 6 further comprising:
   retrieving, by the data deletion server, the delete query corresponding to the deleted set of personal data after the expiration of the defined period of time using the unique identifier of the delete query; and
   running, by the data deletion server, the delete query to confirm deletion of the copy of the deleted set of personal data from the data deletion server after the expiration of the defined period of time based on the delete query returning a null data set proving the deletion.

8. The method of claim 1, wherein the registered client device is selected from a group consisting of a data controller and a data processor.

9. The method of claim 1, wherein a third-party online data deletion service performs the method.

10. The method of claim 9, wherein the third-party online data deletion service only has access to the metadata describing the deleted set of personal data and the hash key based on the deleted set of personal data and not to the copy of the deleted set of personal data.

11. A data deletion server for preserving privacy of deleted personal data, the data deletion server comprising:
    a bus system;
    a storage device connected to the bus system, wherein the storage device stores program instructions; and
    a processor device connected to the bus system, wherein the processor device executes the program instructions to:
      receive a registration request from a client device to the data deletion server, the client device storing a plurality of personal data corresponding to a plurality of data subjects, wherein the client device interacts with the data deletion server via an application programming interface;
      receive a copy of a set of personal data corresponding to a particular data subject, which was deleted and transferred from the registered client device to the data deletion server along with metadata describing the deleted set of personal data and a hash key based on the deleted set of personal data via the application programming interface;
      grant access to the copy of the deleted set of personal data in response to receiving an access request that includes the hash key corresponding to the deleted set of personal data from the particular data subject within a defined period of time; and
      delete the copy of the deleted set of personal data from the data deletion server after expiration of the defined period of time.

12. The data deletion server of claim 11, wherein the processor device further executes the program instructions to:

store proof that the copy of the deleted set of personal data has been deleted from the data deletion server in a hyper-ledger without saving an identifier corresponding to the copy of the deleted set of personal data after the expiration of the defined period of time.

13. The data deletion server of claim 12, wherein the processor device further executes the program instructions to:
provide the proof that the copy of the deleted set of personal data has been deleted to an authorized entity using the hyper-ledger.

14. The data deletion server of claim 11, wherein the processor device further executes the program instructions to:
record deletion of the deleted set of personal data corresponding to the particular data subject from the registered client device in a hyper-ledger;
store the copy of the deleted set of personal data corresponding to the particular data subject, the metadata, and the hash key in a secure container of a structured data store of the data deletion server; and
receive an access request from the particular data subject to access the copy of the deleted set of personal data stored in the secure container, the access request including the hash key.

15. The data deletion server of claim 11, wherein the processor device further executes the program instructions to:
receive an extension of time request from the particular data subject to extend the defined period of time prior to the expiration of the defined period of time; and
extend the defined period of time by an equal amount of time in response to receiving the extension of time request prior to the expiration of the defined period of time.

16. A computer program product embodied in a computer readable storage medium for preserving privacy of deleted personal data having program instructions embodied therewith, the program instructions executable by a data deletion server to cause the data deletion server to perform a method comprising:
receiving, by the data deletion server, a registration request from a client device to the data deletion server, the client device storing a plurality of personal data corresponding to a plurality of data subjects, wherein the client device interacts with the data deletion server via an application programming interface;
receiving, by the data deletion server, a copy of a set of personal data corresponding to a particular data subject, which was deleted and transferred from the registered client device to the data deletion server along with metadata describing the deleted set of personal data and a hash key based on the deleted set of personal data via the application programming interface;
granting, by the data deletion server, access to the copy of the deleted set of personal data in response to receiving an access request that includes the hash key corresponding to the deleted set of personal data from the particular data subject within a defined period of time; and
deleting, by the data deletion server, the copy of the deleted set of personal data from the data deletion server after expiration of the defined period of time.

17. The computer program product of claim 16 further comprising:
storing, by the data deletion server, proof that the copy of the deleted set of personal data has been deleted from the data deletion server in a hyper-ledger without saving an identifier corresponding to the copy of the deleted set of personal data after the expiration of the defined period of time.

18. The computer program product of claim 17 further comprising:
providing, by the data deletion server, the proof that the copy of the deleted set of personal data has been deleted to an authorized entity using the hyper-ledger.

19. The computer program product of claim 16 further comprising:
recording, by the data deletion server, deletion of the deleted set of personal data corresponding to the particular data subject from the registered client device in a hyper-ledger;
storing, by the data deletion server, the copy of the deleted set of personal data corresponding to the particular data subject, the metadata, and the hash key in a secure container of a structured data store of the data deletion server; and
receiving, by the data deletion server, an access request from the particular data subject to access the copy of the deleted set of personal data stored in the secure container, the access request including the hash key.

20. The computer program product of claim 16 further comprising:
receiving, by the data deletion server, an extension of time request from the particular data subject to extend the defined period of time prior to the expiration of the defined period of time; and
extending, by the data deletion server, the defined period of time by an equal amount of time in response to receiving the extension of time request prior to the expiration of the defined period of time.

* * * * *